Patented Oct. 11, 1932

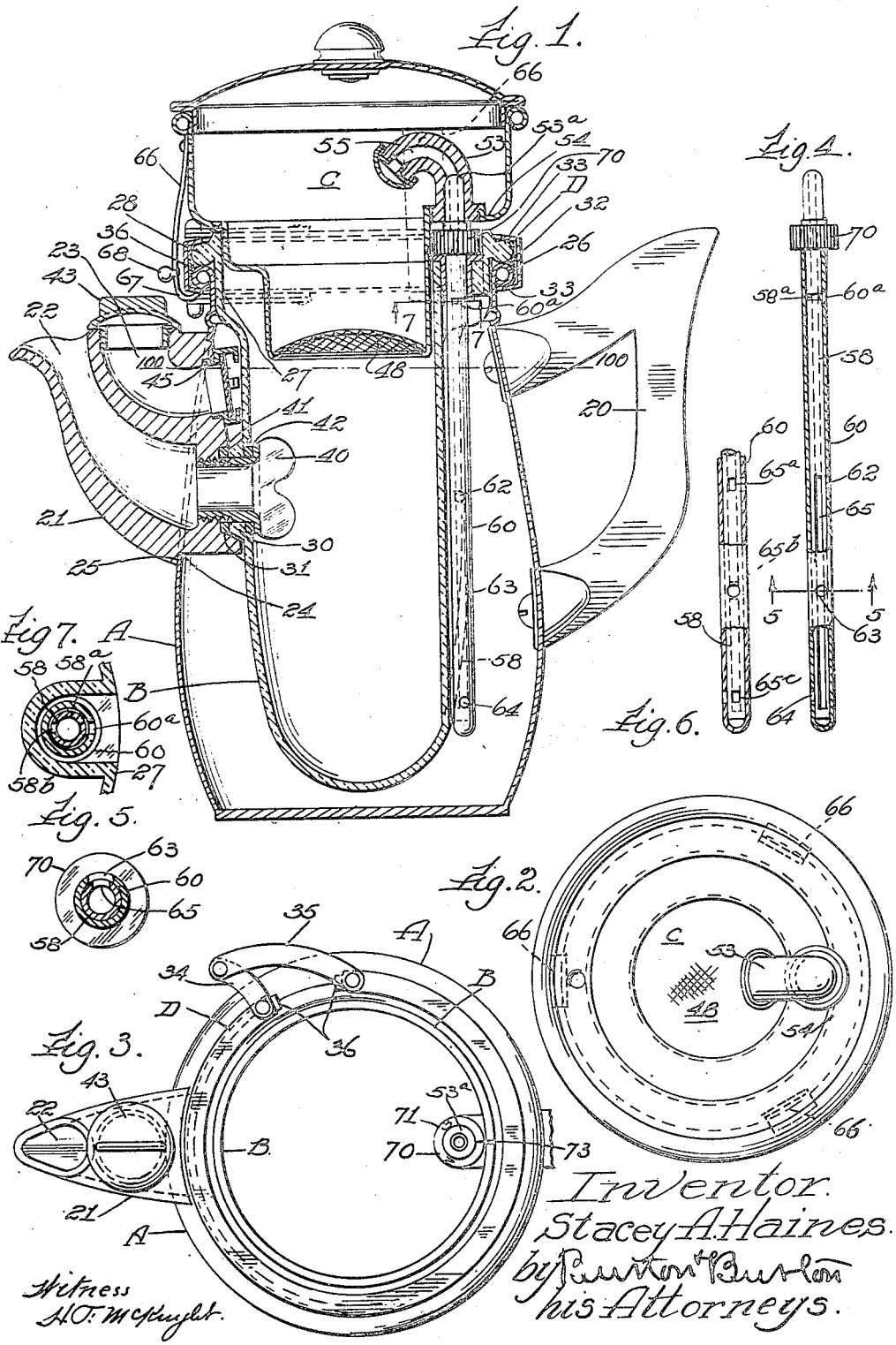

1,882,140

UNITED STATES PATENT OFFICE

STACEY A. HAINES, OF KANSAS CITY, MISSOURI

COFFEE MAKER

Application filed February 20, 1931. Serial No. 517,167.

The purpose of this invention is to provide a cooking utensil for preparing beverages, such as coffee, by a process requiring a special utensil of the type commonly called percolators.

The invention consists in the elements and features of construction shown and described as indicated in the claims.

In the drawing:

Figure 1 is a vertical axial section of a utensil embodying this invention fully assembled.

Figure 2 is a detail top plan view with the cover of the coffee receptacle removed.

Figure 3 is a top plan view of the device with the upper member removed showing the clamping ring for securing the outer shell and inner container in full line as before being tightened for clamping the members together.

Figure 4 is a sectional view of the tubular element by which the hot water is transferred from the boiling chamber for delivery to the material to be treated.

Figure 5 is a section at the line 5—5 on Figure 4.

Figure 6 is a partial view similar to Figure 4 showing a slightly modified form of the valve device.

Figure 7 is a detail section at the line 7—7 on Figure 1 on an enlarged scale.

Referring to the drawing in detail:

A represents the outer metal shell or body of the pot, hereinafter referred to as the outer shell. B represents an inner cup-formed container which may be of glass, porcelain, or other non-magnetic material, and of whatever material it is made, molded or tooled into accurate form for securement to the shell, as hereinafter described. The shell, A, is formed with a handle, 20, at one side, and a spout member, 21, at the opposite side, said spout member, shown as a metal casting, but which may be made in any preferred manner of any suitable material, having a pouring passage, 22, and a filling passage, 23, and at its base fitted to a lateral aperture, 24, in the shell, A, and provided with a stop shoulder, 25, for making junction with the outer surface of the shell, A, to which said spout member is there secured in any manner for making a steam and water-tight joint, as by soldering or brazing, or by electric welding if the shell and spout member are made of metal suitable for electric welding; but not limited to such permanent or undetachable securement.

The shell, A, is preferably made as shown, terminated at its upper open end by an exterior bead, 26, and the container, B, is formed at its upper open end with a neck portion 27, dimensioned for occupying the mouth or neck of the shell, A, and with the terminal exteriorly protruding bead, 28, dimensioned correspondingly to the bead, 26, of the shell, so that when the container is inserted into the shell, as seen in Figure 1, the two beads, 26 and 28, are stopped on each other for suspending the container, B, within the shell, A.

For locking the shell, A, and container, B, together separably, but with a steam and water tight joint, there is provided an interiorly channeled split ring clamp indicated as to its entirety by reference letter, D. This clamp made of suitable thickness and flexibility to adapt it to be removably applied for clamping the beads, 26 and 28, as hereinafter described, has its channel indicated at 32 dimensioned for spanning the beads, 26 and 28, of the shell, A, and container, B, the flanges, 33, 33, of the channel form being preferably, as shown, divergent at an angle and with spread adapting the clamp ring to be engaged about the beads stopped on each other so that in the closing of the ring to circumferentially grip the beads, the taper of the channel in the direction radial with respect to the mouth of the shell and container causes the divergent flanges to wedge the beads toward each other.

For thus closing up the split ring clamp to clamp it about the beads, the opposite ends of the ring at opposite sides of the gap are connected by a toggle consisting of links, 34 and 35, hingedly connected together at one end and at the other end hingedly connected respectively to the opposite ends of the split ring clamp, the link, 34, being shorter than the link, 35, by the amount of the distance between the pivots of the links respectively to the ends of the split clamping ring when the ring is clamped tightly about the juxtaposed beads of the shell and container. But this clamping ring may have non-divergent flanges, and an interposed packing hereinafter described may be relied upon to wedge the beads tightly into contact with the flanges and seal the joint between the beads.

For packing the joint between the beads themselves and between both beads and the channel clamping ring, there is provided a flexible and compressible packing, 36, dimensioned for fitting in the bottom of the channel, and thus encompassing the beads when the ring is in place thereabout. This felt packing is preferably held in the bottom of the channel of the clamping ring by suitable adhesive, or clinchers struck from the bottom web of the channel ring except for a short distance at the ends, and with its ends protruding slightly from the ends of the clamping ring at the split of the latter, so that when the clamping ring is closed up by the toggle provided for that purpose for clamping the ring about the beads, 26 and 28, the packing, clamped onto the beads for sealing the joint between the beads and between the clamping ring and the beads, has its ends tightly crowded together completing the sealing, and may be also crowded between the beads wedging them apart and against the flanges of the clamping ring and thus sealing the joint between the beads.

The cavity of the shell between the same and the container, B, is designed to be supplied with water to be heated and delivered, as hereinafter described, onto the material in the upper container for the treatment thereof in accordance with the purpose of the apparatus.

Since the container is to discharge its contents through the pouring passage of the spout member, provision is made for connecting it with the spout member at the pouring passage of the latter; and for this purpose the container is formed with an apertured boss, 30, which is dimensioned for seating in a correspondingly dimensioned counterbore, 31, at the inner end of the pouring passage, 22; and a wing nut, 40, suitably formed and dimensioned to be introduced by the operator within the container, B, is terminally dimensioned and exteriorly formed for screwing into the counterbore, 31, which is interiorly formed for the purpose, gaskets, 41 and 42, being preferably interposed at proper points to ensure steam-and-liquid-tight joint between the container and the spout member; but a ground joint may, if preferred, be made dispensing with the gaskets.

The filling passage, 23, leads for discharge at the inner end of the spout member above the course of the pouring passage and exteriorly of the container, B; and at its outer end this filling passage is provided with a closure, 43, which, as shown, is a screwed-in plug which the operator will screw in to make a steam-and-water-tight joint. Also automatic means for sealing this filling passage against discharge of water under the pressure of steam developed in the water space of the shell may be provided consisting of a check valve, 45, at the inner end of the filling passage, the spout member being terminated at the inner end of the filling passage, spaced a sufficient distance away from the container for fuel flow from the filling passage past the check valve into the water space of the shell.

The spout member has an inclined shoulder for positioning the seat, 47, for the check valve, 45, whereon the valve will be normaly lodged by gravity, and on which it will be held fully seated by any pressure developed in the shell in the process of heating.

For receiving the ground coffee or other substance to be treated for deriving its soluble values by filtering hot liquid through it, there is provided a second container, C, mounted removably above the shell, A, and the first mentioned container, B, with perforated bottom, 48, overhanging the cavity of the container, B.

For conducting the water which may be brought to boiling point in the shell, for delivery of said hot water onto the ground coffee or other substance to be treated in the container, C, there is provided a valved device consisting of a tubular member, 60, mounted laterally outside the container, B, in the cavity of the shell, A, said tubular member being closed at the lower end and having its upper end extending sealed steam-and-water-tight through the upper annular marginal terminal portion of the container, B, and having connection hereinafter described from its upper end for liquid-tight junction with a downwardly facing seat, 53ª, provided in a downwardly extending nipple, 53, with which the overhanging margin, 54, of the container, C, is furnished, said nipple, 53, being formed terminating an inverted-U-shaped discharge duct, 55, for discharging the water into the container, C, above the coffee or other substance with which said container may be charged for hot water treatment.

For admitting the water from the cavity of the shell, A, into the tubular member, 60, the latter has a plurality of inlet ports, 62, 63, and 64, at different points in the vertical extent of said tubular member below the high water level of the shell cavity; and there is provided a tubular valve member, 58, fitted and adjustable in the cavity of said tubular member, said valve device having a longitudinal slot, 65, extending from a point below the lowest of the inlet ports of the tubular member to a point above the highest of said ports, or a succession of short apertures, 65ª, 65ᵇ, 65ᶜ, (see Figure 6) positioned for registering with said ports respectively, said ports being not only spaced apart vertically, but also angularly about the axis of the tube, so that the valve device may be registered with said ports individually by rotation in the cavity of the tubular member in which it is fitted as described. For this purpose the valve device is shown furnished with a suitable annular boss or knob, 70, accessible at the upper end of the container, B, and graduated as seen at 71 for indicating by relation to the reading point, 73, the adjustment of the valve device, and said valve device extends upwardly above said boss for registration of its upper open end with the nipple, 53, of the container, C, as above mentioned.

As shown, the tubular member, 60, is mounted in a boss, 27ª, in the neck portion, 27, of the container, B, with a bushing sleeve, 28, for fitting it snugly liquid-tight, but removably, in the boss. And to provide relief for the pressure in the water chamber of the shell resulting from the expansion due to heating the water before the boiling points is reached, a very restricted vent port is formed, as seen at 58ª, in the tube member, 50, communicating with an exterior annular groove 58ᵇ, the outer tube, 60, having a port, 60ª, positioned for registering with the groove, 58ᵇ, when the two tube members are properly assembled, so that at all positions to which the inner tube may be adjusted for registration of a higher or lower one of the apertures, 62, 63 and 64, with the slot, 65, the vent communication of the water chamber with the chamber, C, will remain open.

The operation of this apparatus may be understood from the foregoing description, but may be further indicated as follows: The several members, A, B and C, being assembled as seen in Figure 1, water will be supplied to the cavity of the shell through the filling passage, 23, filling the shell cavity to the level indicated by the line, 100, which it will be seen is the highest level to which it will be filled because when the water overflows at the filling entrance, the only escape for air, except for the restricted vent port, 58ª, is at the filling passage.

The receptacle, C, may next be charged with the quantity of ground coffee suitable for a predetermined number of cups of coffee, say, three, six or nine, and the valve member will be adjusted by rotation in the tubular member, 60, for registration of the longitudinal slot, 65, of said valve member with the port corresponding to the quantity of coffee with which the container, C, has been charged. If three cups of coffee are to be provided, the valve member will be adjusted for registration of its slot with the upper port, 62, which will permit discharge by that port under the steam pressure due to heating the water to the boiling point, of the quantity of water in the shell above that port, which as mentioned, is calculated for three cups of coffee. If six cups are desired, the valve member will be adjusted to register its inlet slot with the next lower port, 63, which will permit discharge into the container, B, of the quantity of water in the shell cavity about that port. If nine cups of coffee are desired, the valve member will be adjusted for registration of its inlet slot with the port, 64, which will cause the discharge into the container, C, of the quantity of water above that port in the shell.

Upon considering the construction as described, it will be seen that it is designed for easy disassembly of the separate parts for access to the interior of the shell and exterior of the container, B, for cleansing and sterilization after each instance of use, and this is a leading purpose of the present invention.

For securing the container, C, in position, as seen in Figure 1, and particularly for binding it to both the shell, A, and the container, B, so as to ensure steam-and-water-tight joint at the seating of the upper end of the valve member, 58, in the nipple, 53,—though this is not absolutely essential,—the container, C, may be furnished with spring catches, 66, 66, 66, attached at the upper end of the container, and arranged to engage at their lower hook ends, 67, under the clamping ring, D, and to be manually disengageable by use of a finger lug, 68, provided at the lower end.

I claim:

1. An apparatus for the purpose specified having an outer shell for containing water, an inner container for collecting product of the apparatus mounted removably in the shell and means for effecting liquid-tight junction of the shell and container at their upper end portions to enclose and seal the water space around the container below said junction, and a combined filling and pouring spout member mounted liquid-tight at an aperture in the wall of the outer shell and protruding outwardly and extending upwardly outside said shell, said spout member having a pouring passage and a filling passage, the latter located above and inwardly with respect to the shell from the former, said spout member being terminated at the lower end of said spout member and inner end of the pouring passage by means making a liquid-tight junction with the pouring passage and with the inner container, for connecting the cavity of the latter with the pouring passage and sealing said pouring passage from the water space of the shell.

2. An apparatus for the purpose specified having an outer shell for containing water and an inner container for collecting the product of the apparatus mounted removably in the shell, and means effecting liquid-tight junction of the shell and container at their upper end portions to enclose and seal a water space of the shell around the container below said junction; a spout member mounted on the shell and protruding outwardly and extending inwardly across the water space of the shell and having a pouring passage throughout its extent from inner to outer end and furnished at the inner end of said pouring passage with means for liquid-tight junction with the inner container, said spout member having a filling passage above the pouring passage opening at the inner end in the water space outside the inner container, and a check valve at the discharge of the filling passage in the water space opening inwardly with respect to said water space and arranged to be seated against outflow by fluid pressure developed in the shell cavity.

3. An apparatus for the purpose specified comprising in combination with an outer shell for containing water, an inner container for collecting the product of the apparatus mounted removably in the shell, and means for effecting liquid-tight junction of the shell and container at their upper end portions to enclose and seal the water space of the shell around the container below said junction, a spout member mounted on the shell protruding outwardly and extending inwardly across the water space and having a pouring passage throughout its extent from inner to outer end, the inner container and said spout member being cooperatively formed for detachable securement of the spout member to the container at the entrance to the pouring passage of the latter, said apparatus comprising a second container for material to be subjected to liquid treatment mounted removably above the first mentioned container; a valve conduit extending in the water space of the shell and protruding above the shell, the second container having connection arranged for making junction with said projecting conduit for conducting water for discharge into said second container, said conduit being closed at its lower part and having a plurality of inlets for water from the water space of the shell at predetermined distances below the high water level of the shell, and an exteriorly operable valve device adjustable for controlling said inlets.

4. In an apparatus for the purpose indicated, in combination with a lower chamber for containing water to be heated to the boiling point, an upper chamber for containing substance to be treated by the boiling water, an intermediate chamber for collecting liquid derived from the upper chamber from the content thereof; a valved conduit leading from the lower chamber for discharge in the upper chamber, said conduit extending in the water space of the lower chamber and protruding above said chamber, the upper chamber having connection arranged for making junction with said protruding conduit for conducting the water delivered through the latter from the lower chamber for discharge downwardly in the upper chamber, and valve means associated with said conduit for determining the level at which the water contact of the lower chamber has access to said conduit, said valve means being accessible for operation exteriorly of the lower chamber.

5. In an apparatus for the purpose indicated, in combination with a lower chamber for containing water to be heated to the boiling point, an upper chamber for containing substance to be treated by the boiling water, an intermediate chamber for collecting liquid derived from the upper chamber from the content thereof; a valved conduit leading from the lower chamber for discharge downwardly in the upper chamber, said conduit being closed at the lower part and having a plurality of inlets for water from the water space of the lower chamber at predetermined distances and intervals below the high water level of said lower chamber, and exteriorly operable valve means adjustable for controlling said inlets.

In testimony whereof, I have hereunto set my hand at Chicago, Illinois, this 18th day of February, 1931.

STACEY A. HAINES.